(12) United States Patent
Chen et al.

(10) Patent No.: US 10,094,974 B2
(45) Date of Patent: Oct. 9, 2018

(54) MULTICORE OPTICAL FIBER WITH A RANDOMIZED CORE STRUCTURE

(71) Applicant: Corning Incorporated, Corning, NY (US)

(72) Inventors: Minghan Chen, Saint Johns, FL (US); Ming-Jun Li, Horseheads, NY (US); Jeffery Scott Stone, Addison, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 15/337,376

(22) Filed: Oct. 28, 2016

(65) Prior Publication Data

US 2017/0123146 A1 May 4, 2017

Related U.S. Application Data

(60) Provisional application No. 62/247,272, filed on Oct. 28, 2015.

(51) Int. Cl.
*G02B 6/02* (2006.01)
*G02B 6/032* (2006.01)
*G02B 6/06* (2006.01)

(52) U.S. Cl.
CPC ......... *G02B 6/02042* (2013.01); *G02B 6/032* (2013.01); *G02B 6/06* (2013.01)

(58) Field of Classification Search
CPC .............................. G02B 6/032; G02B 6/02042
See application file for complete search history.

(56) References Cited

U.S. PATENT DOCUMENTS

| 4,613,205 | A | 9/1986 | Seiji et al. |
| 5,479,550 | A * | 12/1995 | Nishioka ............... C03B 37/028 385/116 |
| 7,450,806 | B2 | 11/2008 | Bookbinder et al. |
| 7,921,675 | B2 | 4/2011 | Bookbinder et al. |
| 2004/0264513 | A1 | 12/2004 | Shima et al. |
| 2011/0129190 | A1 | 6/2011 | Fini et al. |
| 2013/0188949 | A1 | 7/2013 | Fini et al. |
| 2013/0302002 | A1 | 11/2013 | Imamura |
| 2014/0003776 | A1* | 1/2014 | Gibson ................... G02B 6/06 385/116 |

(Continued)

FOREIGN PATENT DOCUMENTS

| EP | 1492206 A1 | 12/2004 |
| EP | 292440 A1 | 9/2015 |
| JP | 2015041078 A | 8/2013 |

OTHER PUBLICATIONS

International Search Report and Written Opinion PCT/US2016/059051 dated Apr. 28, 2017.

(Continued)

*Primary Examiner* — Omar R Rojas
(74) *Attorney, Agent, or Firm* — Svetlana Z. Short (57) ABSTRACT

Multicore optical fibers are disclosed that have randomly arranged cores within a cladding matrix. In some cases, the cores are defined by air lines formed in a glass matrix. The cores can have an edge-to-edge spacing designed so that the multicore optical fiber operates in either a weak-coupling regime or a strong-coupling regime. Imaging systems and optical fiber communication systems that utilize the multicore fibers disclosed here are also presented.

28 Claims, 8 Drawing Sheets

(56) References Cited

U.S. PATENT DOCUMENTS

| | | | |
|---|---|---|---|
| 2014/0064687 A1* | 3/2014 | Hoover | G02B 6/03644 385/126 |
| 2015/0063755 A1 | 3/2015 | Doany et al. | |
| 2016/0070059 A1 | 3/2016 | Chen et al. | |
| 2016/0161673 A1 | 6/2016 | Hamaguchi et al. | |

OTHER PUBLICATIONS

Karbasi, "Observation of transverse Anderson localization in an Optical Fiber" Optics Letters, 37, 2304 (2012).

Karbarsi, "Image transport through a disordered optical fiber mediated by transverse Anderson localization" Nature Communications 5, 3362 (2014).

Chen and M. Li, "Observing transverse Anderson localization in random air line based fiber" Proc. SPIE 8994.

International Searching Authority Invitation to Pay Additional Search Fees PCT/US2016/059051 dated Jan. 23, 2017.

* cited by examiner

MULTICORE OPTICAL FIBER WITH A RANDOMIZED CORE STRUCTURE

This application claims the benefit of priority under 35 U.S.C. § 119 of U.S. Provisional Application Ser. No. 62/247,272 filed on Oct. 28, 2015, the content of which is relied upon and incorporated herein by reference in its entirety.

FIELD

The present disclosure relates to multicore optical fibers, and in particular to a multicore optical fiber with a randomized core structure.

The entire disclosure of any publication or patent document mentioned herein is incorporated by reference.

BACKGROUND

Multicore optical fibers are optical fibers that include a plurality of cores embedded in a cladding matrix. The cores are typically identical or have two different types of cores placed next to each other to reduce the cross-talk between adjacent cores.

For optical communication applications like space division multiplexing, the cores have regular core arrangement or pattern, such as a triangular lattice arrangement, a square lattice arrangement, a ring arrangement or other periodic structure with select cores spacing between adjacent cores.

A regular (i.e., periodic) arrangement of the cores is necessary to facilitate coupling light into each core at the respective ends of the multicore optical fiber, as well as to reduce cross-talk. More particularly, a regular or periodic core arrangement is used to match the regular or periodic arrangement of the fibers or detector elements in connectors used at the respective ends of the multicore optical fiber to optically couple to devices of the optical communication system.

SUMMARY

One embodiment disclosed herein is a multicore optical fiber that includes: a glass matrix having a front endface, a back endface, a length, a refractive index $n_{20}$ and a central axis, and a plurality of cores randomly arranged within the glass matrix and that run generally parallel to the central axis between the front and back endfaces. The cores have respective refractive indices $n_{50}$, wherein $n_{50} > n_{20}$, and wherein the glass matrix serves as a common cladding for the plurality of cores so that each core and the common cladding define a waveguide. Any two cores have an edge-to-edge spacing S that is greater than a minimum distance $S_{MIN}$ defined by a maximum amount of allowable cross-talk between adjacent cores.

At least one exemplary embodiment of a multicore optical fiber includes: a glass matrix having a front end face, a back end face, a length, refractive index $n_{20}$ and a central axis; and a plurality of air lines randomly arranged within the glass matrix and that run generally parallel to the central axis, with 25% or greater of the airlines running the full length between the front and back endfaces. The air lines have a refractive index $n_{120}$, wherein $n_{120} < n_{20}$. The air lines define in the glass matrix a plurality of randomly arranged first cores that in combination with the plurality of airlines defines a plurality of first waveguides. Any two first cores have an edge-to-edge spacing S that is greater than a minimum distance $S_{MIN}$ defined by a maximum amount of allowable cross-talk between adjacent first cores.

At least one exemplary embodiment of r the multicore optical fiber described immediately above and further includes second cores embedded in the glass matrix and that run generally parallel to the central axis between the front and back endfaces, the second cores having a refractive index $n_{50}$ wherein $n_{50} > n_{20}$, and wherein the second cores in combination with the glass matrix define a plurality of second waveguides.

According to another exemplary embodiment a multicore optical fiber includes: a glass matrix having a front endface, a back endface, a length, a refractive index $n_{20}$ and a central axis; a plurality of cores randomly arranged within the glass matrix and that run generally parallel to the central axis between the front and back endfaces and having respective refractive indices $n_{50}$, wherein $n_{50} > n_{20}$, and wherein the glass matrix serves as a common cladding for the plurality of cores so that each core and the common cladding define a waveguide; and wherein any two cores have an edge-to-edge spacing that is smaller than a maximum distance defined by a minimum amount of cross-talk between adjacent cores of 50%.

According to at least one exemplary embodiment fiber bundle includes two or more of the multicore optical fibers as disclosed herein and that have front end faces in a first common endface plane and the back end faces in a second common endface plane.

At least one embodiment disclosed herein is an imaging system for imaging an object. The imaging system includes: at least one of the multicore optical fibers as described herein and that operate in a weak-coupling regime (e.g., less than 10% cross talk), an object operably arranged adjacent the front end face; and an image sensor operably arranged adjacent the back endface.

At least one embodiment disclosed herein is an optical fiber communication system that includes: at least one multicore optical fiber as described herein and that operates in a strong-coupling regime (e.g., a minimum amount of cross-talk between adjacent cores of 50%); an optical transmitter optically coupled to the front endface and that generates light at an operating wavelength of the at least one multicore optical fiber, wherein the light travels within the cores of the at least one multicore fiber as guided light; and a detector optically coupled to the back endface and that detects the guided light that exits the cores of the multicore fiber at the back endface.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the Detailed Description serve to explain principles and operation of the various embodiments. As such, the disclosure will become more fully understood from the following Detailed Description, taken in conjunction with the accompanying Figures, in which.

DETAILED DESCRIPTION

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

The claims as set forth below are incorporated into and constitute part of this Detailed Description.

Cartesian coordinates are shown in some of the Figures for the sake of reference and are not intended to be limiting as to direction or orientation.

The term "random" as used here in connection with the arrangement or distribution of cores or air lines within the glass matrix is not limited to complete spatial randomness such as associated with a spatial Poisson process. The term "random" includes any aperiodic or other non-regular pattern. The random arrangement of cores can be accomplished by making spatial perturbations to a regular pattern so that the core positions are shifted randomly around the core locations defined by a regular pattern. In an example, at least some of the core position shifts from a regular pattern are greater than 2 microns. In an example, the random arrangement or positioning of the cores is performed or otherwise designed in a constrained manner wherein adjacent cores have a minimum spacing $S_{MIN}$ defined by a maximum amount of allowable cross-talk between adjacent cores.

Also, reference to a core or air line "running between" the front and back endfaces of the multicore fiber means that the core or airline spans the entire length of the fiber and is continuous over the length of the fiber. In the description below, the cores all run between the front and back end faces, whereas the air lines need not all run between the front and back endfaces.

In the discussion below, "cross-talk" is referred to as light coupling between cores, though those in the art will understand that it is actually the light coupling that occurs between waveguides. For first and second cores, if light with power P1 is launched into the first core only, and the power of the light coupled from the first core to the second core is ΔP1, then the power of the light in the second core is measured as P2=ΔP1, and the amount of cross-talk from the first to the second core as measured in % is defined as $C_T = \Delta P_1/P_1$. The cross-talk as measured in decibels (dB) is given by CT=10 log [$\Delta P_1/P_1$].

For more than two cores, only the neighboring cores (e.g., only those that immediately surround a given core) have significant contributions to the cross-talk, so that the cross-talk from all the neighboring cores is added together, i.e., CT=$\Sigma \Delta P_1/P_1$ measured as a percentage or $\Sigma 10 \log [\Delta P_1/P_1]$ measured in dB, where Σ stands for "summation over neighboring cores."

Multicore Fiber

Figure 1:
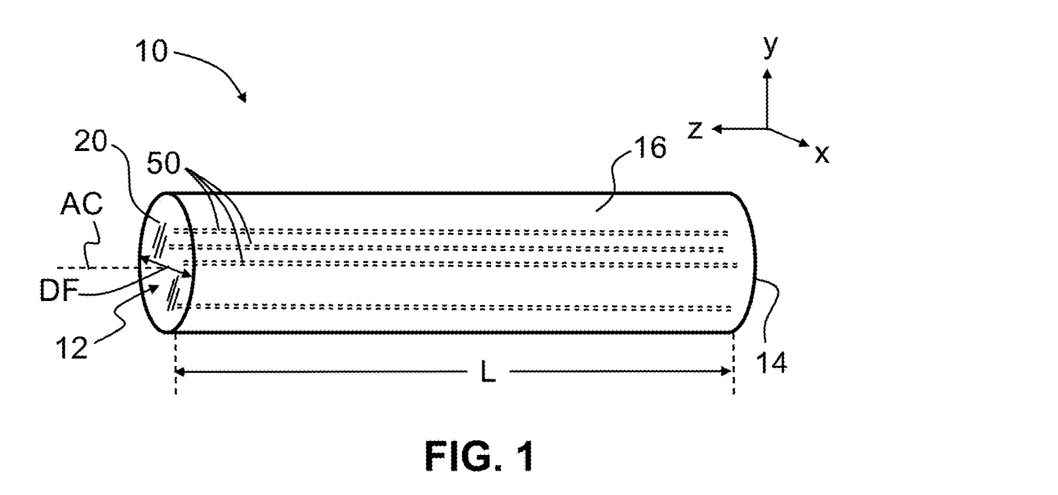
FIG. 1 is a front isometric view of an example multicore optical fiber ("multicore fiber") according to the disclosure, showing a few example cores within a glass matrix.

FIG. 1 is a front isometric view of an example multicore optical fiber ("multicore fiber") 10 according to the disclosure. The multicore fiber 10 has a central axis AC (shown running in the z-direction), a front endface 12, a back endface 14 and an outer surface 16. The multicore fiber 10 has a diameter DF and an axial length L, which measured between the front and back endfaces 12 and 14. The multicore fiber 10 includes a transparent dielectric matrix 20 in which is formed or embedded a plurality of cores 50 that are randomly arranged in (x,y) and that run longitudinally, i.e., generally parallel to central axis AC, and that run between front and back endfaces 12 and 14. In an example, the central axis AC of multicore fiber 10 is also the central axis of glass matrix 20.

In an example, the transparent dielectric matrix 20 is made of glass and so is referred to hereinafter as "glass matrix" 20. Thus, in an example, cores 50 all reside in glass matrix 20. Three cores 50 are shown in FIG. 1 for ease of illustration. In a first type of multicore fiber 10, cores 50 are made of solid material embedded in glass matrix 20, which serves as a common cladding to the cores, in which case the glass matrix is also referred to as "cladding" 20. However, as discussed below, in a second type of multicore fiber 10, glass matrix 20 defines cores 150, with air lines defining the common cladding.

Considering now the first type of multicore fiber 10, cladding 20 has a refractive index $n_{20}$ while the cores 50 have a refractive index $n_{50}$, wherein $n_{50} > n_{20}$, so that the multiple cores and surrounding common cladding together define multiple waveguides WG (see FIG. 2), wherein the number of waveguides is the same as the number of cores.

Figure 2:
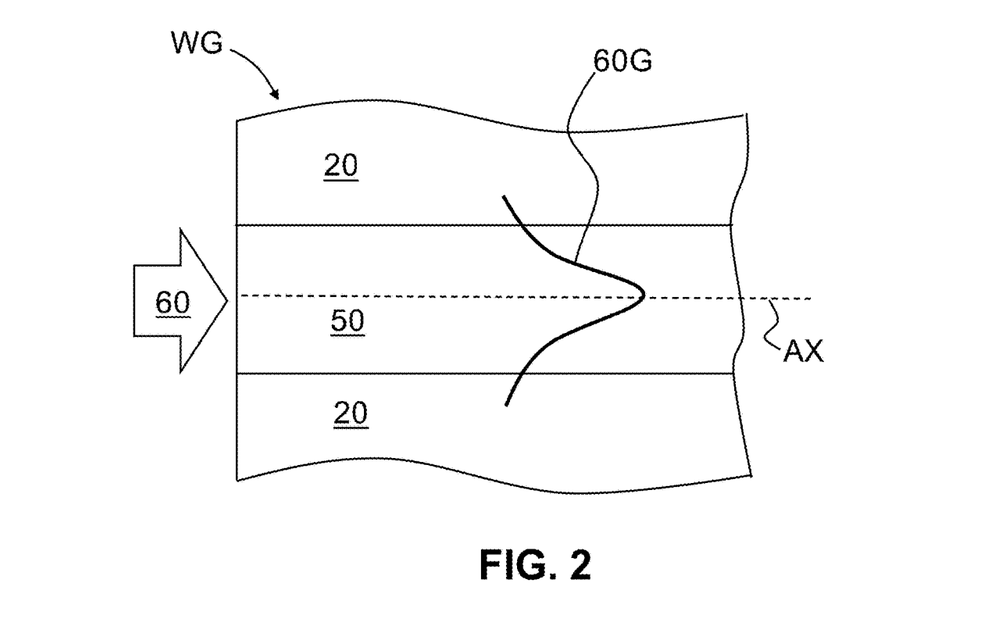
FIG. 2 is a close-up cross-sectional view of a portion of the multicore fiber of FIG. 1 at the front endface and showing one of the cores and the surrounding cladding that together define a waveguide, and also showing a guide mode traveling mainly within the core.

FIG. 2 is a close-up cross-sectional view of a portion of multicore fiber 10 at front endface 12 showing one core 50 and the surrounding cladding 20, the combination of which defines waveguide WG. Light 60 is shown as being incident upon front endface 12 at core 50 and then traveling in waveguide WG as a guided wave (or "guided light" or "guided mode") 60G. The guided wave 60G travels mainly in core 50, with a small portion of the guided light traveling in cladding 20 just outside of the core as evanescent light. The representation of guided wave 60G can be thought of as an intensity profile of a single mode centered on a core axis AX.

In an example, cladding 20 and cores 50 are configured so that the guided light 60G is single mode at an operating wavelength. In another example, cladding 20 and at least some of cores 50 are configured to support multiple guided modes 60G at an operating wavelength. For ease of discussion, the cores 50 are referred to being either a "single mode" or "multimode" even though it is the combination of cladding 20 and core 50 that defines the light-guiding properties of a given core of multicore fiber 10. In an example, the operating wavelength is a visible wavelength while in another example is one of the known telecommunication wavelengths (e.g., nominally about 850 nm, or about 1300 nm or about 1550 nm). In another example, the operating wavelength is in the range from 400 nm to 2000 nm, which includes near-infrared wavelengths as well as visible wavelengths.

In an example, cladding 20 can be made of pure silica, while in another example includes an index-decreasing dopant such as F or B. Also in an example, cores 50 can include an index-increasing dopant such as Ge, Ti, Al, P or Ta.

In an example, the cores 50 need not all be the same, i.e., need not have all of the same properties. For example, cores 50 need not have the same refractive index $n_{50}$. Also in an example, cores 50 need not have the same refractive index profile, which in an example can be defined by an alpha parameter and one or more relative refractive index values (i.e., "deltas") as is known in the art. Cores 50 need not all have the same shape, same size, etc. Cores 50 can also have shapes other than circular, e.g., oval, polygonal, irregular, etc.

The multicore fiber 10 has a cross-sectional area $A_{10}$ and is shown in the examples herein has having a circular cross-sectional shape. Other cross-sectional shapes besides circular (e.g., oval, rectangular, square, D-shape, etc.) can also be used. Each core 50 has a cross-sectional area $A_{50}$, and the total area $A_T$ of the cores is the sum of the individual core areas, i.e., $A_T = \Sigma A_{50}$. The total cross-sectional area of the cladding is $A_{20}$, while the effective area $A'_{20}$ is given by the cross-sectional area $A_{20}$ minus the total core area $A_{10}$, i.e., $A'_{20} = A_{20} - A_T$.

The total number of cores 50 in multicore fiber 10 is denoted N. In various examples, N≥10 or N≥50 or N≥100 or N≥250. In an example, a core density ρ is given by the number N of cores per fiber area $A_F$ or the cladding area $A_{20}$. In various examples of multicore fiber 10, the core density ρ>800/mm² or ρ>4000/mm² or ρ>4000/mm² or ρ>20000/mm². It is noted that in some examples, the cladding area $A_{20}$ is the same as the fiber area $A_{10}$, and the cladding diameter DC is the same as the fiber diameter DF. In other examples, the fiber and cladding areas $A_F$ and $A_{20}$ are different, such as in the example now discussed immediately below.

Figure 3:
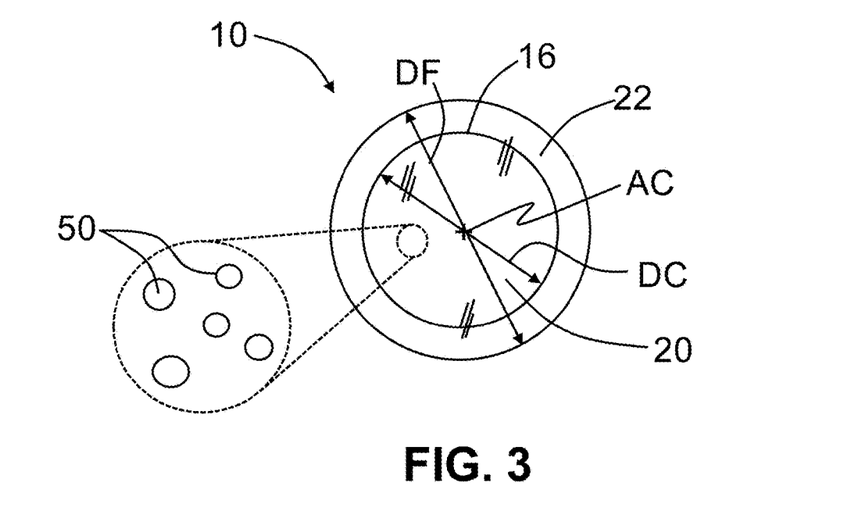
FIG. 3 is a front-on view of an example multicore fiber that includes an outer cladding that surrounds the main cladding that encompasses the multiple cores.

FIG. 3 is a front-on view of multicore fiber 10 illustrating an embodiment wherein the multicore fiber includes an outer cladding layer ("outer cladding") 22 that surrounds the outer surface 16 of cladding 20. The outer cladding 22 can be employed to control the size of the cladding 20 and the multicore region defined thereby. The outer cladding 22 can be made of pure silica or doped silica. The close-up inset of FIG. 3 shows some of the randomly arranged cores 50. Note that in the embodiment of FIG. 3, the cladding area $A_{20}$ is not the same as the fiber area $A_{10}$ because the fiber area includes the annular area of the outer cladding 22. Likewise, the cladding diameter DC is not the same as the fiber diameter DF.

In examples, multicore fiber 10 can be configured operate in either of two main regimes: a weak-coupling regime or a strong-coupling regime, depending on the application. In the weak-coupling regime, the cross-talk between cores 50 is negligible, and each core behaves like a separate waveguide. This regime is suitable for imaging applications to achieve high image quality. In the strong-coupling regime, the cores 50 can exchange substantial amounts of optical power during propagation of the guided waves 60G therein, or the modes from different cores can mix with each other, resulting low time delays or high bandwidth. This regime is attractive for high speed data transmissions for short-reach applications because it does not require accurate alignments to each core, which results in low cost coupling components for transceivers.

There is a significant amount of cross-talk between periodically arranged substantially identical cores 50 that is inherent in the periodic core configuration. The optical energy carried by a guided wave 60G propagating in one core 50 is more easily transferred into other cores by evanescent coupling, i.e., cross-talk coupling in a periodic arrangement of waveguides. Strong cross-talk causes an image formed by such a multicore fiber to become blurry. To reduce the amount of cross-talk associated with the weak-coupling regime, the core spacing can be increased, but this reduces the image resolution. By introducing a randomized core configuration (which includes at least one of a varying core position, core shape, core refractive index, core size, etc.), cross-talk effects can be reduced significantly, thus improving the imaging quality.

Multicore Fiber with Same-Size Cores

Figure 4:
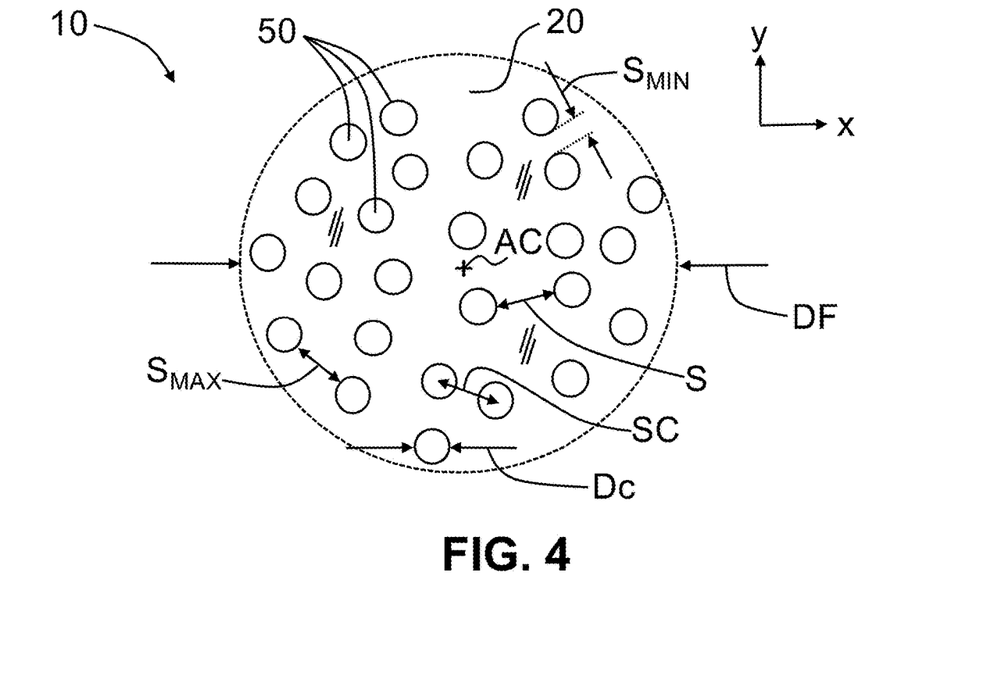
FIG. 4 is a cross-sectional view of an example multicore fiber that includes randomly distributed cores that have the same size.

FIG. 4 is a cross-sectional view of an example multicore fiber 10 taken in the x-y plane and illustrates an example wherein cores 50 all have the same size, e.g., the same diameter Dc. The cores 50 may not have not have the same refractive index $n_{50}$ and may not have the same refractive index profile. The cores 50 are randomly arranged within cladding 20, i.e., have random (x,y) positions. The edge-to-edge spacing between any two cores 50 is denoted S, and the spacing varies depending on the cores 50 selected, including adjacent cores. The spacing S is not the same for all adjacent cores, although some adjacent cores can have the same spacing or substantially the same spacing since the cores are randomly arranged. The edge-to-edge spacing S can be used determine a center-to-center spacing SC by knowing the diameter Dc of the two cores 50 associated with the spacing measurement.

In an example where multicore fiber 10 is designed to operate in the weak-coupling regime, the (x,y) positions of cores 50 are constrained by the condition that the spacing S between two adjacent cores (or any two cores) has to be greater than a minimum spacing $S_{MIN}$ associated with a maximum allowed amount of cross-talk $CT_{MAX}$. In one example, $CT_{MAX}$ is 10%, while in other example $CT_{MAX}$ is 6%, while in another example $CT_{MAX}$ is 3%. In another example where optimum performance is not essential, a certain percentage of adjacent cores can have spacing smaller than $S_{MIN}$, e.g., 2% of the adjacent-core spacings or even 5% of the adjacent-core spacings.

In an example of a multicore fiber 10 that operates in the strong-coupling regime, the (x,y) positions of cores 50 are also constrained by the condition that the spacing S between two adjacent cores (or any two cores) has to be smaller than a maximum spacing $S_{MAX}$ (see FIG. 4) associated with a minimum amount of cross-talk $CT_{MIN}$, wherein in one example, $CT_{MIN}$ is 50%, while in other example $CT_{MIN}$ is 70%, while in another example $CT_{MIN}$ is 100%. Thus, in an example where the minimum amount of cross-talk $CT_{MIN}$ is 50%, the spacing S can be such that the cross-talk between adjacent cores 50 can be anywhere from 50% to 100%, wherein the spacing $S=S_{MAX}$ corresponds to 50% cross-talk.

Figure 5A:
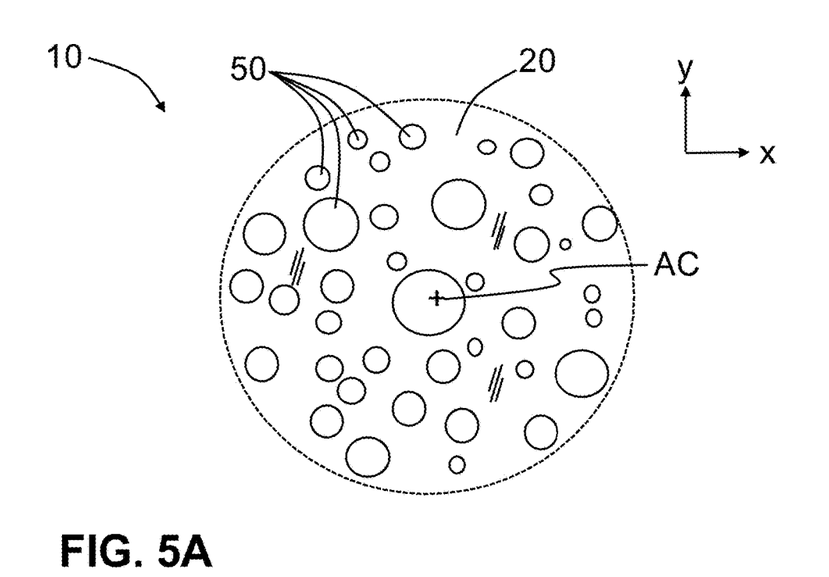
FIGS. 5A and 5B are cross-sections views of an example multicore fiber wherein the cores are randomly distributed and have different sizes and shapes, with the multicore fiber of FIG. 5B having a higher core density than that of FIG. 5A.

FIG. 5A is a cross-sectional view of example multicore fiber 10 similar to that of FIG. 4 and that illustrates an example wherein cores 50 have randomly arranged (x,y) positions and do not all have the same diameter Dc. In an example, the core diameters Dc can be selected so that all of the cores are single mode, while in another example the core diameters can be selected so that some of the cores are single mode while some are multimode. In another example, all of cores 50 can be multimode.

Figure 5B:
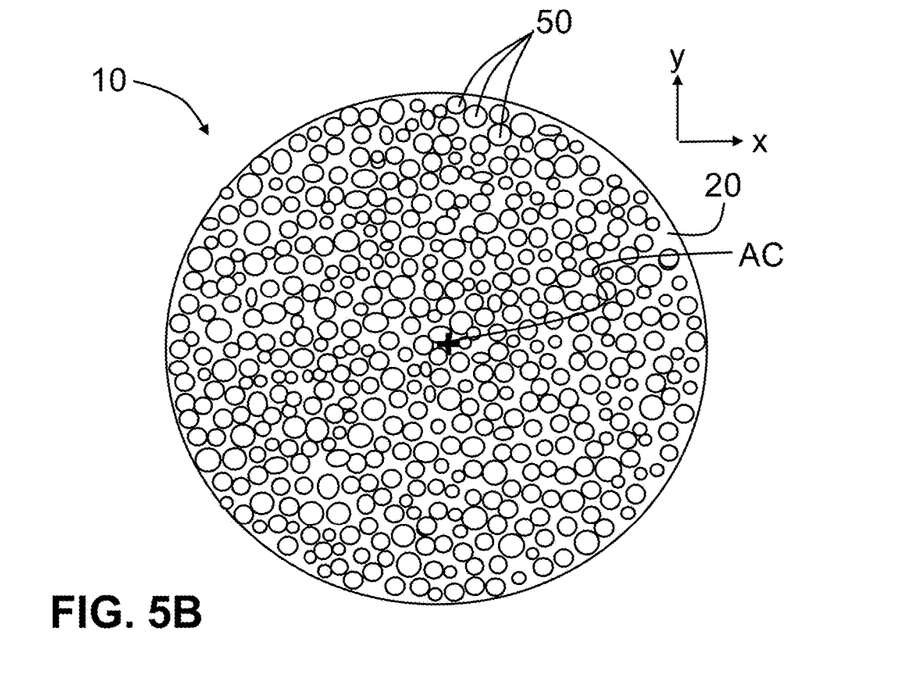

FIG. 5B is similar to FIG. 5A and illustrates an example embodiment wherein the core density ρ is higher than that of FIG. 5A, and wherein the cores 50 have a variety of cross-sectional shapes other than circular. For example, some of the cross-sectional shapes of cores 50 are oval or elongate with varying degrees of eccentricity.

The number N of cores 50 arranged in cladding 20 can vary, with the maximum number $N_{MAX}$ being advantageously employed for applications where multicore fiber 10 is used for imaging, as discussed below. The maximum number $N_{MAX}$ of cores 50 (as well as the maximum core density $ρ_{MAX}$) represents the most cores 50 that can fit within cladding 20 while satisfying the spacing condition of $S_{MIN}$ for the weak-coupling regime.

Thus, an example of a first type of multicore fiber 10 has randomly arranged cores 50 subject to the spacing constraint based on a cross-talk limit for operating either in the weak-coupling regime or the strong-coupling regime, wherein the cores can have or can define at least one of: same sizes, different sizes, same refractive index profiles, different refractive index profiles (e.g., core deltas), same shapes, different shapes, different core densities p, and a maximum number $N_{MAX}$ of cores (or a maximum core density $ρ_{MAX}$). Here, the cores 50 having "different properties" means that not all of the cores have the same property, i.e., some of the cores can have the same property.

Multicore Fiber with Air Lines that Define Low-Index Cores

Figure 6A:
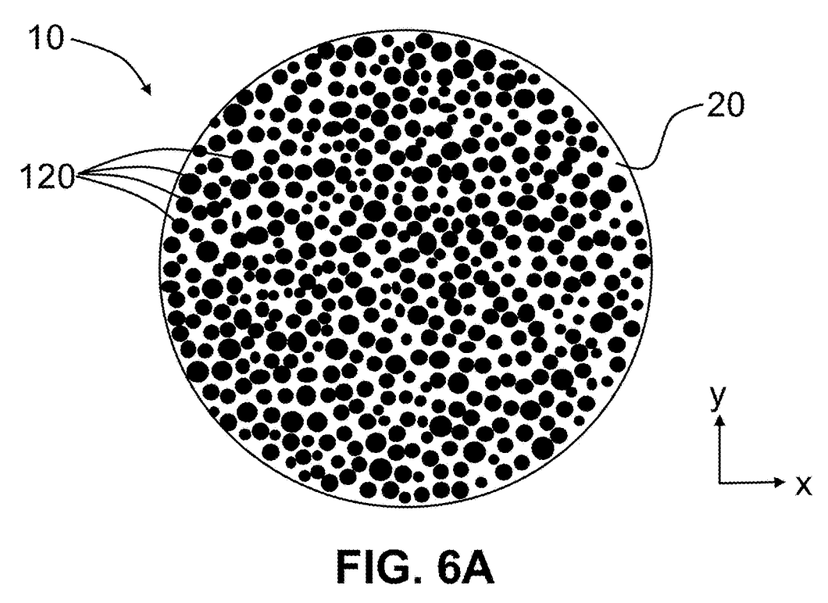
FIG. 6A is a cross-sectional view of an example multicore fiber wherein the cores are defined in the glass matrix by a random arrangement of air lines that run longitudinally down the glass matrix.

FIG. 6A is a cross-sectional view of an example of a second type of multicore fiber 10 that includes glass matrix 20 having longitudinally running holes (hereinafter, "air lines") 120 formed therein and wherein at least some of the airlines run from front endface 12 to back endface 14. The air lines 12 can be formed using techniques know in the art (see, e.g., U.S. Pat. Nos. 7,450,806 and 7,921,675).

In an example, the glass matrix 20 is glass, e.g., pure silica glass or doped silica glass. The air lines 120 have random (x,y) positions and can have different shapes and sizes, including random shapes and sizes. In an example, the average maximum dimension (e.g., diameter for circular cross-sectional shape) Da of air lines 120 (see FIG. 5B) is in the range from a few nanometers to a few microns (e.g., 3 nm to 10 microns). Having at least some of air lines 120 running continuously through the entire length of multicore fiber 10 serves to minimize the propagation loss due to air line discontinuities.

In various examples, the percentage of the total number of air lines 120 that are continuous along the entire length L of multicore fiber 10 is 10% or greater, or 25% greater, or 50% or greater, or 75% or greater, while in an example all of the airlines (i.e., 100%) are continuous over the entire length L. Each airline 120 has a refractive index $n_{120}$ that is either substantially equal that of air or to a gas other than air that resides in the air lines. In an example, $n_{120}$ is taken to be equal to 1, i.e., the index of refraction of vacuum, by way of approximation.

The randomly arranged air lines 120 serve to define randomly arranged cores 150 formed by the remaining areas of the solid glass matrix 20. Because the cores 150 are defined by the glass matrix 20, they will have a refractive index $n_{150}$ that is lower than the refractive index $n_{50}$ of cores 50 discussed above. Thus, cores 50 can be considered as a first type of core and are referred hereinafter as "high-index cores" while cores 150 can be considered as a second type of core and referred to hereinafter as "low-index cores" for ease of discussion and to distinguish between the two types of cores.

Figure 6B:
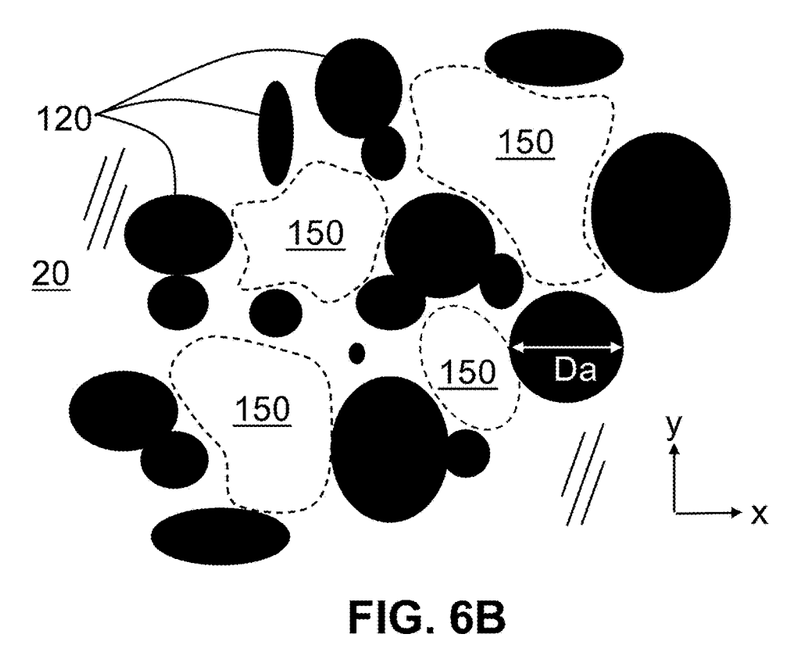
FIG. 6B is a close-up view of a portion of the end face of the example multicore fiber of FIG. 6A illustrating how the air lines define irregularly shaped low-index cores in the glass matrix, with the air lines defining a cladding.

FIG. 6B is a close-up cross-sectional view of a portion of air lines 120 and glass matrix 20. The low-index cores 150 defined by air lines 120 in glass matrix 20 can have irregular shapes as defined by the gaps or interstices formed by the air lines. Because not all of the air lines 120 touch each other, many if not most (and sometimes all) of low-index cores 150 are not discrete, i.e., they are not formed by physically separated portions of glass matrix 20. However, air lines 120 serves to optically isolate adjacent low-index cores 150 so that even though the adjacent low-index cores are physically connected by the glass matrix, the cross-talk is between the low-index cores is substantially reduced if not eliminated entirely.

In an example, the average maximum core dimension (e.g., diameter Dc for a circular cross-sectional shape) of low-index cores 150 is less than 10 microns, and more preferably less than 6 microns. The air fill fraction AF (i.e., the ratio of the total area $A_{120}$ of the air holes 120 to the solid area $A_S$ of the glass matrix 20, i.e., $AF=A_{120}/A_S$) is preferably greater than 5%, more preferably greater than 10%, and even more preferably than 20%.

Multicore Fibers with Low-Index Cores and High-Index Cores

Figure 7:
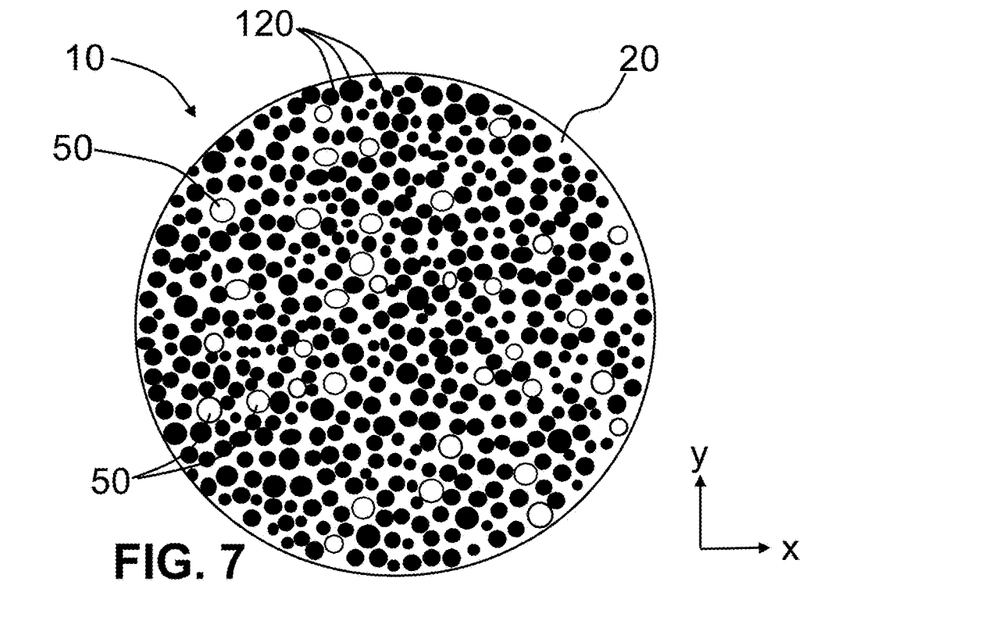
FIG. 7 is a cross-sectional view of an example multicore fiber that includes the high-index cores of FIGS. 4, 5A and 5B combined with the low-index cores of FIG. 6B as defines by the randomly arranged air lines.

FIG. 7 is a cross-sectional view of an example multicore fiber 10 that includes both high-index cores 50 and the airline-defined low-index cores 150 formed in glass matrix 20. The high-index cores 50 and the low-index cores 150 can have random sizes and shapes. The high-index cores 50 can be doped with an index raising dopant such as Ge, Ti, Al, P, Ta. The glass matrix 20 serves as the aforementioned cladding for the high-index cores 50 while portions of the glass matrix also serving as low-index cores 150 as defined by air lines 120. The glass matrix 20 can be made of pure silica or silica with an index decreasing dopant such as F, and B.

In an example, the core delta for the high-index cores 50 is greater than 0.3%, more preferably greater than 0.5%, and even more preferably greater than 1%, and most preferably greater than 2%. In an example, the high-index cores 50 have a maximum dimension (e.g., a diameter Dc for a circular cross-section) of less than 10 microns, more preferably less than 6 microns and even more preferably less than 2 microns. The average diameter Da of air lines 120, as noted above, can range from a few nanometers to few microns.

The positions of the high-index cores 50 and air lines 120 can be randomly arranged, with the latter defining randomly arranged low-index cores 150. In the embodiment of FIG. 7, the cores of multicore fiber 10 are constituted by both the high-index cores 50 and the low-index cores 150.

Multicore Fiber Fabrication

The various embodiments of the multicore fibers 10 disclosed herein can be fabricated by using a stack and draw method as is known in the art. First, a glass core blank and a glass tube are prepared, for example by an OVD method. Then glass cores canes and tubes canes with desired diameters and lengths are redrawn from the glass core blank and glass tube. The glass core canes and glass tubes can have different diameters to achieve different core diameters in the fiber. Then, the core canes and tube canes are inserted into a large diameter glass tube to form a preform assembly. The tube wall forms a thin layer of outer cladding. Additional outer cladding layer can be added by depositing glass by OVD process. Finally, the preform assembly is drawn into the multicore fiber using a fiber draw tower.

Example Multicore Fiber

An example multicore fiber 10 according to the example shown in FIGS. 5A and 5B was fabricated using a core blank fabricated using the OVD method. The core was doped with Ge and the cladding was pure silica. The core delta was 1%. The core/cladding ratio CCR was 0.47. The core blank was then redrawn to multiple canes of about 3 mm at a length of 1 meter.

The core canes were inserted into a quartz tube with dimensions of 40 mm ID and 50 mm OD and 20" in length, creating a tight bundle inside the tube. Once the build was complete, the tube assembly was Cl purged in a consolidation furnace to remove any impurities in an effort to enhance draw performance. The preform was drawn to form example multicore fibers, with different fiber diameters DF of 75, 100, 125, 150, 250 and 350 microns. The number N of cores 50 in each multicore fiber 10 was 125 and the core delta was 1%.

The diameters DC of cladding 20 for the fiber diameters DF of 75, 100, 125, 150, 250 and 350 microns are 55.35, 73.8, 92.25, 110.7, 184.5, 258.3 microns, respectively, and the average individual core diameters Dc are 1.8, 2.3, 2.9, 3.5, 5.8, 8.2 microns, respectively. The core densities $\rho$ for the different example multicore fibers are (using the fiber diameter DF): $\rho$=28309, 15924, 10191, 7077, 2548, and 1300 per $mm^2$, respectively.

Figure 8:
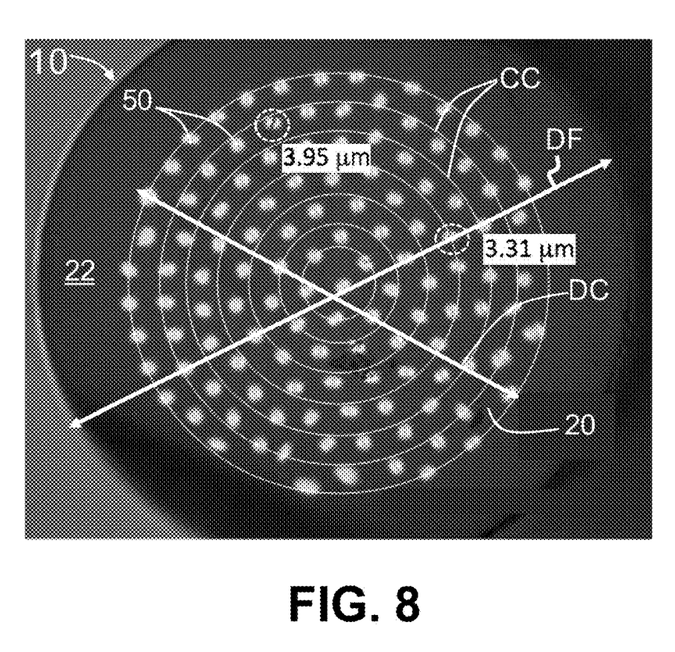
FIG. 8 is a picture of an example multicore fiber that illustrates on example of how the cores have positions, sized and shapes that vary from a periodic arrangement, wherein concentric circles are superimposed on the picture to show the variation or perturbation in the core positions.

FIG. 8 is a picture of a cross-section an example multicore fiber 10 fabricated per above. The multicore fiber 10 has a nominal diameter DF of 150 microns that is partially defined by an outer cladding 22 surrounding the inner or main cladding 20. The cladding 20 has a diameter DC of about 110.7 microns and the number N of cores is N=125. The core density $\rho$ (using the fiber area $A_F$) is thus given by:

$$\rho = N/A_F = N/[\pi(DF/2)^2] = (125)/[\pi(0.150 \text{ mm}/2)^2] = 7102.$$

The core density $\rho$ becomes 13158 if just the area $A_{20}$ of cladding 20 is used. The average core diameter Dc is about 3.5 microns.

Two example cores 50 are highlighted by dashed-line circles and have respective diameters of Dc=3.95 microns and 3.31 microns as indicated in the Figure. Concentric circles CC are superimposed on the picture and serve as a periodic reference to show the variation or perturbation in the core positions from regular or periodic positions.

It can be seen from FIG. 8 that the positions of cores 50 are not perfectly periodic (i.e., they are aperiodic). On average, the spacing S between adjacent cores 50 is 11.16 microns with a deviation of ±2.93 microns, which represents a spacing perturbation (i.e., spacing variation) of about 26%. Also, the size and shape of cores 50 are randomly distributed.

The transmission loss of the fabricated multimode fibers 10 was measured for wavelengths $\lambda$ of 640 nm to 1700 nm. The overall numerical aperture NA of the multicore fiber 10 was also measured. Table 1 below summarizes the measurement results.

TABLE 1

Measured Transmission Loss

| | Fiber diameter DF (microns) | | | | | |
|---|---|---|---|---|---|---|
| | 75 | 100 | 125 | 150 | 250 | 350 |
| Transmission window (nm) | — | 700-825 | 695-1195 | 710-1365 | 680-1700 | 670-1700 |
| Loss @ 750 nm (dB/km) | — | 5.36 | 4.53 | 5.46 | 4.56 | 3.85 |
| Loss @ 850 nm | — | — | 3.23 | 2.66 | 2.62 | 2.35 |
| Loss @ 1060 nm | — | — | 2.11 | 1.44 | 1.61 | 1.33 |
| Loss @ 1310 nm | — | — | — | 1.65 | 0.86 | 0.65 |
| Loss @ 1550 nm | — | — | — | — | 0.71 | 2.02 |
| Numerical Aperture NA | 0.118 | 0.167 | 0.178 | 0.183 | 0.186 | 0.203 |

The transmission window gets wider with increasing fiber diameter DF. The numerical aperture NA also increases with increasing fiber diameter DF.

Imaging System

Figure 9A:
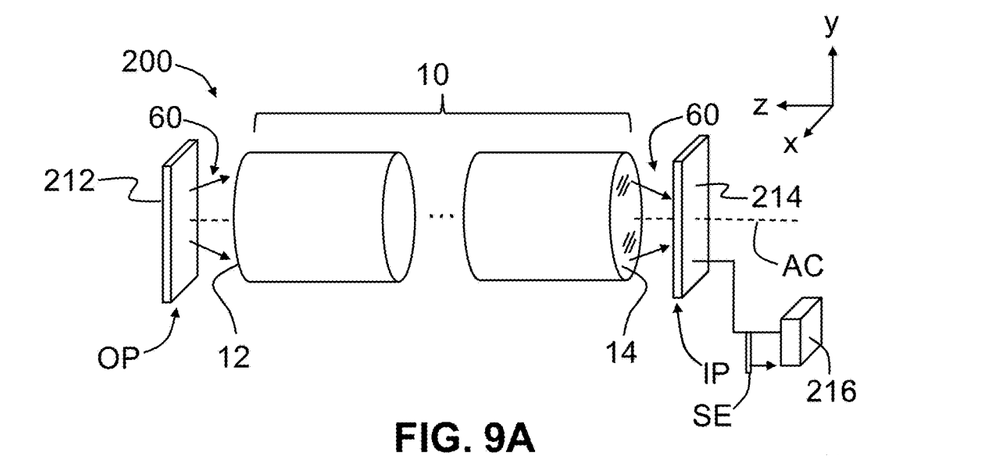
FIGS. 9A and 9B are side isometric views of an example imaging system that employs at least one multicore fiber as disclosed herein, with FIG. 9B showing an example of a multicore fiber bundle.
Figure 9B:
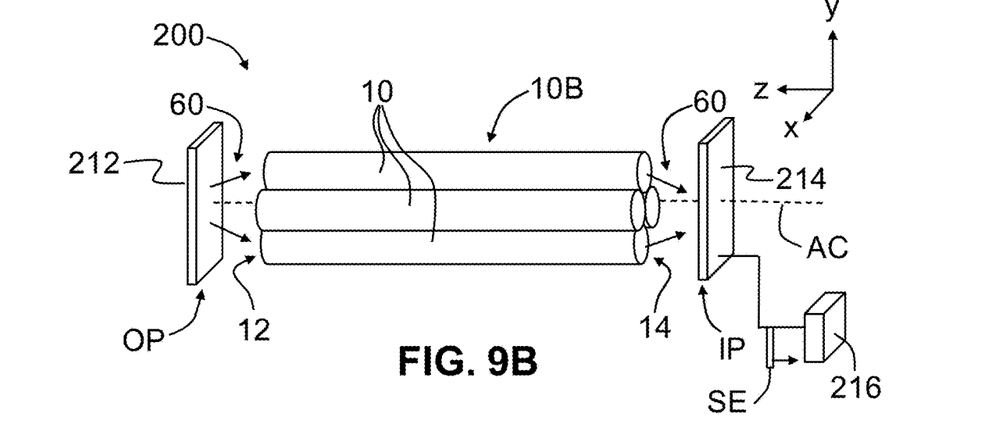

FIGS. 9A and 9B are side isometric views of an example imaging system 200 that employs at least one multicore fiber 10 as disclosed herein. The imaging system 200 includes an object plane OP at which an object 212 resides, and an image plane IP. FIG. 9A shows an example imaging system 200 that includes a single multicore fiber 10 while FIG. 9B shows four multicore fibers 10 arranged as a fiber bundle 10B.

Figure 9C:
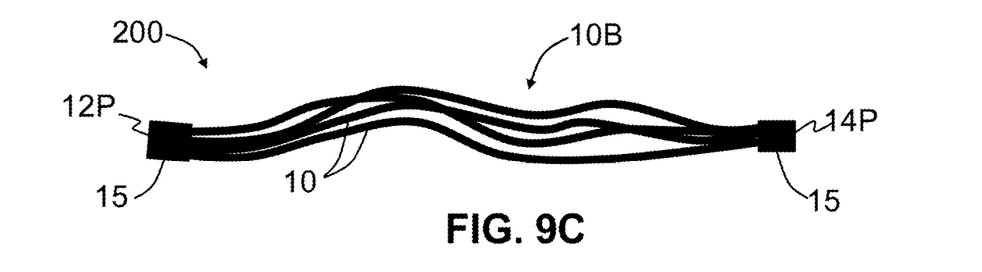
FIG. 9C is a side view of an example multicore fiber bundle that includes multiple multicore fibers terminated at opposite ends with respective terminating members that respectively serve to keep together the front endfaces and the back endfaces of the different multicore fibers at respective front and back endface planes.

FIG. 9C is a side view of an example fiber bundle 10B that includes terminating members 15 that serve to keep together the respective front and back endfaces of the different multicore fibers 10 in respective front and back endface planes 12P and 14P. A plastic jacket layer (not shown) can be place around the multicore fiber bundle 10B to protect it. Any reasonable number of multicore fibers 10 can be used (e.g., bundled) as needed to meet the imaging requirements. It is also noted that while the multicore fibers 10 and fiber bundle 10B are shown in some cases as being straight for ease of illustration, they can also include reasonable bends consistent with a tolerable amount of bending loss, such as shown in FIG. 9C.

Figure 10A:
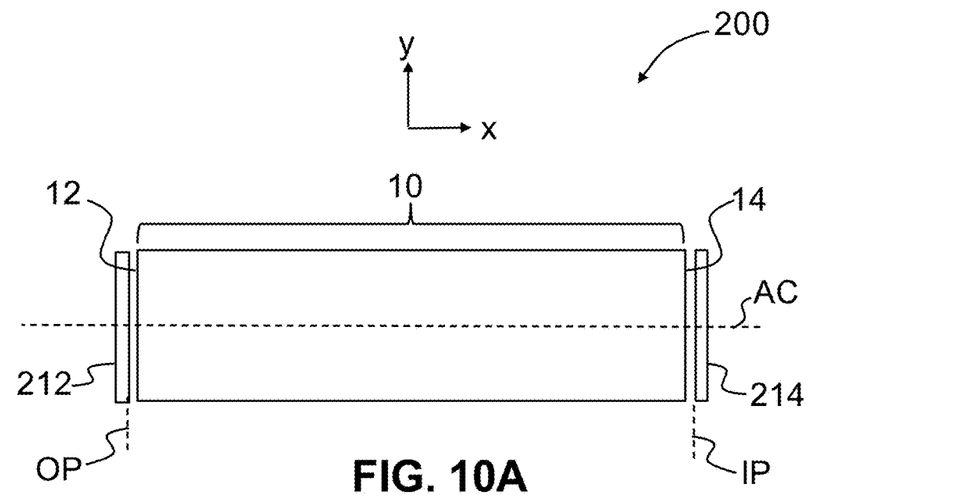
FIG. 10A is a side view of an example configuration of the imaging system of FIG. 9A showing a configuration wherein the object is arranged at the front endface and an image sensor is arranged at the back endface.
Figure 10B:
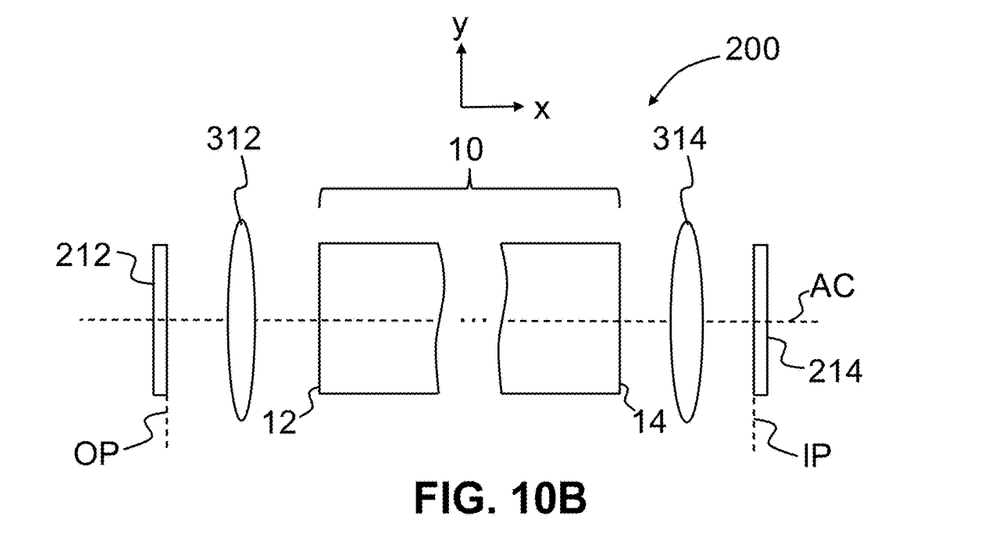
FIG. 10B is similar to FIG. 10A and illustrates an example configuration that employs an input optical system between the object and front end face and that employs an output optical system between the image sensor and the back end face.

FIG. 10A is a side view of the imaging system 200 of FIG. 9A, wherein the object plane OP and object 212 are located at (e.g., in contact with) front endface 12, and the image plane IP and an image sensor 214 are arranged at (e.g., in contact with) back endface 14. FIG. 10B is similar to FIG. 10A and illustrates an example wherein the object plane OP is located a distance away from front endface 12, and an input optical system 312 is used to direct light from object 210 to front endface 12. FIG. 10B also shows the image plane IP located at a distance away from the back endface 14 and an output optical system 314 used to capture light exiting the back endface 14 to form an image at the image plane.

With reference to FIGS. 9A and 9B, in the operation of imaging system 200, light 60 emitted by or reflected from object 210 is directed to the front endface 12 of multicore fiber 10. Some of light 60 is coupled into cores 50 and propagates down the multicore fiber as guided light 60G (see FIG. 2) and exits back endface 14. An image is then formed at image plane IP (either directly at end face 14 or as imaged by output optical system 314) and captured by image sensor 214. The image sensor 214 in response generates an electrical signal SE that can be sent to a processor 216 electrically connected to the image sensor. In an example, processor 216 is configured to receive and process electrical signal SE to form a processed image, which can be stored in memory, displayed on a display, etc.

For imaging applications, multicore fiber 10 preferably operates in the weak-coupling regime while having a relatively high core density p, and more preferably has substantially the maximum core density $\rho_{MAX}$ (e.g., within 10% of the actual maximum core density $\rho_{MAX}$). In an example, the respective sizes of cores 50 and 150, and their edge-to-edge separations S are on the order of a few microns. A relatively large index contrast is needed between the cores 50 and the cladding 20 to tightly confine the guided light 60G in each core and to reduce cross-talk between the cores to obtain good image quality.

The resolution of the image formed at image plane IP is limited by the discrete cores 50 and/or 150, which define image pixels. The resolution is also limited by the amount of light coupling or cross-talk between cores. Reducing the core dimensions can increase the core density (and thus the image pixel density), but at some point leads to an unacceptable amount of cross-talk between cores because the smaller cores result in the evanescent portion of guided wave 60G extending farther out from the core. The increased cross-talk results in a blurred image and a lower signal-to-background ratio. In addition, there is a limit to how small the cores can be made while still being able to support a guided mode 60G.

The amount of cross-talk depends sensitively the wavelength $\lambda$ of light 60, as well as the polarization state of the light. The imaging performance of multicore fiber 10 is thus generally determined by the interplay of the core density and inter-core light coupling. For example, the wavelength $\lambda$ may be situated in 800 nm to 1600 nm wavelength range, and may be, for example 635 nm, 840 nm, 850 nm, 950 nm, 980 nm, 1250 nm, 1310 nm, 1350 nm, 1550 nm or another wavelength in 800 nm to 1600 nm wavelength range. (I.e., the operating wavelength of the optical system or the light source that the fiber 10 is designed, optimized for, or is coupled to when used in the data transmission system).

Performance Measurements

Image transmission experiments were performed on a fabricated multicore fiber 10 having a diameter DF=125 microns to analyze the cross-talk and image transmission performance. The fiber had Ge doped cores with about 1% delta. The number N of cores 50 was N=125. The average spacing S between adjacent cores 50 was measured as 9.32±2.44 microns. This indicates about a 26% spacing perturbation between adjacent cores 50. A reasonable random size perturbation for cores 50 is about 10%. Thus, the spacing variation of the cores generates a significant amount of perturbation that can be used reduce the core-to-core coupling (i.e., cross-talk).

Experiments were also carried out to measure the amount of cross-talk between cores. A laser diode light source having a center wavelength of 635 nm and a bandwidth of about 1 nm was used to illuminate select cores 50 at the input endface 12 of the multicore fiber 10 and the outputted light at back endface 14 was measured. The averaged cross-talk over the 1 nm band width was measured to be about 6%, which is significantly lower than reported for other commercial fiber bundles, such as the Fujikura FIGH-10-350S.

Imaging experiments were also conducted using a 1951 USAF resolution target image transported through multicore fiber 10. The bar image was group 5 and element 3 with a line width of 15.63 μm. After propagating 2 meters of the multicore fiber, the output image was captured with an image sensor in the form of a CCD camera with a pixel size of about 0.505 microns. The captured image was analyzed and based on the pixel size, the measured bar width in the image was calculated to be about 15.6 μm. This measured width agreed with the original bar width of the object, indicating no significant reduction in imaging system resolution due to cross-talk.

Data Transmission System

Figure 11:
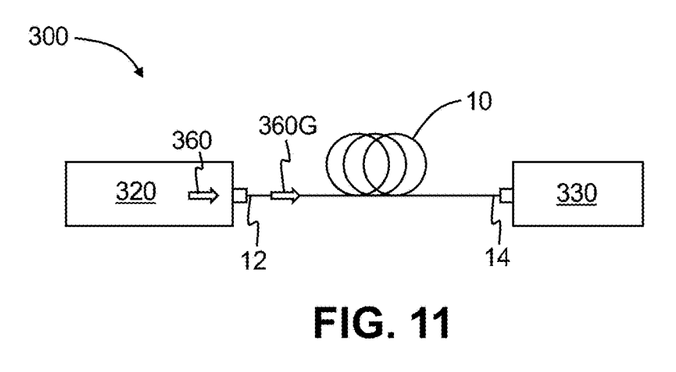
FIG. 11 is a schematic diagram of an optical fiber transmission system that employs an example multicore fiber as disclosed herein.

FIG. 11 is a schematic diagram of an example optical fiber transmission system ("system") 300 that employs a transmitter (light source) 320 that emits modulated light 360, and a receiver 330 optically connected by at least one multicore fiber 10 that carries the modulated light 360 as guided light 360G. The multicore fiber 10 defines an optical link for data transmission. The receiver 330 is configured to receive modulated guided light 360G from output end 14 of the random multicore fiber 10. The transmitter 320 can be one that is used with a VCSEL-based or an SiPh-based transmitter.

The transmitter 320 emits modulated light 360 (i.e., modulated optical signals) having a wavelength in the range from 800 nm to 1600 nm and multicore fiber 10 can have operating wavelengths in this range. The transmitter 320 can also consist of or otherwise include a SiP-based light source, which in an example emits modulated light 360 having a wavelength in the range from 1250 nm to 1650 nm. The transmitter 320 can also consist of or otherwise include a VCSEL-based light source, such as used in CWDM applications in a wavelength range of 840 nm to 980 nm or 840 nm to 950 nm. A VCSEL light source can also emit light in the wavelength range from 800 nm to 1350 nm. Thus, in an example, transmitter 320 can emit light 360 of different wavelengths in the given wavelength range, e.g., for WDM-related applications.

The multicore fiber 10 is configured to have high bandwidth BW for operating wavelengths such as used in system 300 of FIG. 11. In examples, the bandwidth BW is greater than 1 GHz·km, or greater than 2 GHz·km or even greater than 3 GHz·km over a wavelength range of greater than 100 nm, for example, 850-950 nm, 950 to 1060 nm, 1200 to 1350 nm. In an example, multicore fiber 10 has a numerical aperture NA that is greater than 0.12, more preferably greater than 0.15, and even more preferably greater than 0.2. The diameter DF of the multicore region of multicore fiber 10 (see FIG. 1 or FIG. 3) is greater than 25 microns, for example is 30, 40, 50, 62.5, 80 or 100 microns.

Figure 12:
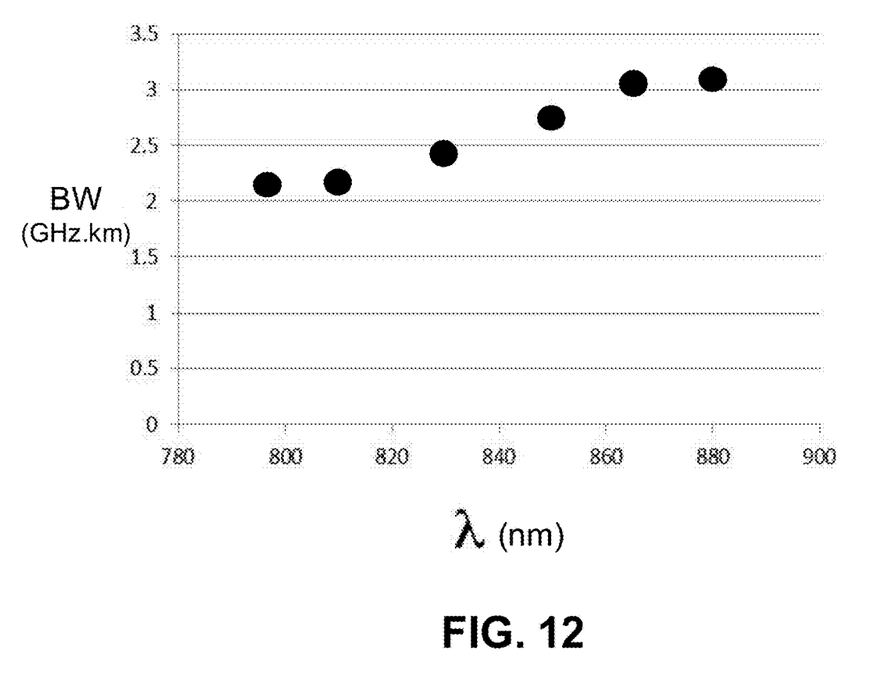
FIG. 12 is a plot of the bandwidth BW (GHz·km) versus wavelength (nm) for wavelengths in the range from 796 to 880 nm for an example multicore fiber as disclosed herein.

Bandwidth measurements were also made on the aforementioned example multicore fiber 10. The measurements were made at multiple wavelengths around 850 nm using overfilled launch condition. FIG. 12 is a plot of the bandwidth BW (GHz·km) versus wavelength λ (nm) for wavelengths in the range from 796 to 880 nm. The bandwidth BW increases from 2.1 GHz·km to 3.1 GHz·km from the low end to the high end of the wavelength range. The bandwidth results indicate that multicore fiber 10 is suitable for short distance signal transmission for data center applications.

It will be apparent to those skilled in the art that various modifications to the preferred embodiments of the disclosure as described herein can be made without departing from the spirit or scope of the disclosure as defined in the appended claims. Thus, the disclosure covers the modifications and variations provided they come within the scope of the appended claims and the equivalents thereto.

What is claimed is:

1. A multicore optical fiber comprising:
a glass matrix having a front end face, a back end face, a length, refractive index n20 and a central axis;
a plurality of air lines randomly arranged within the glass matrix and that run generally parallel to the central axis, with 25% or greater of the airlines running the full length between the front and back endfaces, the air lines having a refractive index n120, wherein n120<n20, and wherein the airlines define in the glass matrix a plurality of randomly arranged first cores that in combination with the plurality of airlines defines a plurality of first waveguides; and wherein any two first cores have an edge-to-edge spacing S that is greater than a minimum distance SMIN defined by a maximum amount of allowable cross-talk between adjacent first cores, wherein the maximum amount of allowable cross-talk ≤10%.

2. The multicore optical fiber according to claim 1, wherein the air lines each have a maximum dimension, and wherein the average of the maximum dimensions is between 3 nm and 10 microns.

3. The multicore optical fiber according to claim 1, wherein 50% or greater of the air lines run the full length between the front and back end faces.

4. The multicore optical fiber according to claim 1, wherein the plurality of cores is equal to or greater than 100 cores.

5. The multicore optical fiber according to claim 1, wherein the cores define a core density of 1000 per square millimeter or greater.

6. The multicore optical fiber according to claim 1, wherein the glass matrix consists of either pure silica or doped silica.

7. The multicore optical fiber according to claim 1, wherein the maximum amount of allowable cross-talk between adjacent first cores is 10%.

8. The multicore optical fiber according to claim 1, further comprising:
second cores embedded in the glass matrix and that run generally parallel to the central axis between the front and back endfaces, the second cores having a refractive index n50 wherein n50>n20, and wherein the second cores in combination with the glass matrix define a plurality of second waveguides.

9. The multicore optical fiber according to claim 8, wherein the second cores are randomly arranged within the glass matrix.

10. The multicore optical fiber according to claim 8, wherein the first cores and the second cores have respective first and second maximum dimensions of 10 microns or smaller.

11. The multicore optical fiber according to claim 8, wherein the second cores have a circular cross-sectional shape.

12. A fiber bundle, comprising:
two or more of the multicore optical fibers according to claim 1, arranged with the front end faces in a first common plane and the back end faces in a second common plane.

13. A fiber bundle, comprising:
two or more of the multicore optical fibers according to claim 8, arranged with the front end faces in a first common plane and the back end faces in a second common plane.

14. An imaging system for imaging an object, comprising:
at least one of the multicore optical fibers according to claim 1;
an object operably arranged adjacent the front end face; and
an image sensor operably arranged adjacent the back endface.

15. An imaging system for imaging an object, comprising:
at least one of the multicore optical fibers according to claim 8;
an object operably arranged adjacent the front end face; and
an image sensor operably arranged adjacent the back endface.

16. The multicore optical fiber according to claim 1, wherein the cores each have a refractive index profile, a size and a cross-sectional shape, and wherein the cores each have at least one of the same refractive index profile, the same size and the same shape.

17. The multicore optical fiber according to claim 16, wherein the cross-sectional shape of the cores is circular.

18. The multicore optical fiber according to claim 1, wherein the waveguides are all single mode at a wavelength either in the visible wavelength range or in the wavelength range from 400 nm to 2000 nm.

19. The multicore optical fiber according to claim 1, wherein the glass matrix consists of pure silica and each of the cores consists of doped silica.

20. The multicore optical fiber according to claim 1, wherein each of the cores has a maximum dimension of less than 10 microns.

21. A fiber bundle, comprising:
two or more of the multicore optical fibers according to claim 1, arranged with the front end faces in a first common endface plane and the back end faces in a second common endface plane.

22. An imaging system for imaging an object, comprising:
at least one of the multicore optical fibers according to claim 1;
an object operably arranged adjacent the front end face; and
an image sensor operably arranged adjacent the back endface.

23. A multicore optical fiber comprising:
a glass matrix having a front endface, a back endface, a length, a refractive index n20 and a central axis;
a plurality of cores randomly arranged within the glass matrix and that run generally parallel to the central axis between the front and back endfaces and having respective refractive indices n50, wherein n50>n20, and wherein the glass matrix serves as a common cladding for the plurality of cores so that each core and the common cladding define a waveguide; and wherein any two cores have an edge-to-edge spacing that is smaller than a maximum distance defined by a minimum amount of cross-talk between adjacent cores of 50%.

24. An optical fiber communication system comprising:
at least one multicore optical fiber according to claim 23;
an optical transmitter optically coupled to the front endface and that generates light at an operating wavelength of the at least one multicore optical fiber, wherein the light travels within the cores of the at least one multicore fiber as guided light;
a detector optically coupled to the back endface and that detects the guided light that exits the cores of the multicore fiber at the back endface.

25. The optical fiber communication system according to claim 24, wherein the at least one multicore fiber has a bandwidth greater than 1 GHz·km, wherein the operating wavelength is within a wavelength range of greater than 100 nm.

26. The optical fiber communication system according to claim 24, wherein the wavelength range is one of: 850 nm to 950 nm, 950 nm to 1060 nm, and 1200 nm to 1350 nm.

27. The multicore optical fiber according to claim 23, wherein the plurality of cores is equal to or greater than 100 cores.

28. The multicore optical fiber according to claim 23, wherein the cores define a core density of 1000 cores per square millimeter or greater.

* * * * *